United States Patent
Huens (10) Patent No.: US 8,882,026 B2
(45) Date of Patent: Nov. 11, 2014

(54) METHOD AND DEVICE FOR OPENING AN INFLATED WALL

(75) Inventor: Thomas Huens, Toulouse (FR)

(73) Assignee: Centre National d'Etudes Spatiales (C.N.E.S.), Paris (FR)

( * ) Notice: Subject to any disclaimer, the term of this patent is extended or adjusted under 35 U.S.C. 154(b) by 468 days.

(21) Appl. No.: 13/152,708

(22) Filed: Jun. 3, 2011

(65) Prior Publication Data

US 2011/0297784 A1   Dec. 8, 2011

(30) Foreign Application Priority Data

Jun. 3, 2010   (FR) ...................................... 10 02355

(51) Int. Cl.
  *B64B 1/46*   (2006.01)
  *B64D 17/72*  (2006.01)
  *B64D 17/02*  (2006.01)

(52) U.S. Cl.
  CPC ............... *B64D 17/02* (2013.01); *B64D 17/72* (2013.01)
  USPC .................. 244/31; 83/54; 83/651.1; 244/99

(58) Field of Classification Search
  CPC .................................... B64B 1/46; B64B 1/48
  USPC ........... 244/31, 33, 99; 83/30, 54, 200.1, 580, 83/651.1, 661, 744, 745; 446/220; 30/380
  See application file for complete search history.

(56) References Cited

U.S. PATENT DOCUMENTS

| | | | | |
|---|---|---|---|---|
| 2,756,948 A * | 7/1956 | Winzen et al. | ................... | 244/31 |
| 2,774,400 A * | 12/1956 | Frickhofen | .................... | 30/502 |
| 3,495,590 A * | 2/1970 | Zeiller | .............................. | 602/9 |
| 4,281,571 A * | 8/1981 | Yates | .............................. | 83/542 |
| 4,398,347 A * | 8/1983 | Duffy | ............................ | 30/90.1 |
| 4,884,328 A * | 12/1989 | Neighbors | ................... | 29/401.1 |
| 5,027,516 A * | 7/1991 | Howerton | ....................... | 30/335 |

FOREIGN PATENT DOCUMENTS

| | | |
|---|---|---|
| CN | 200954877 Y | 10/2007 |
| CN | 201 111 836 Y | 9/2008 |
| EP | 1 207 102 A2 | 5/2002 |
| JP | 3 262797 A | 11/1991 |
| JP | 10 157697 A | 6/1998 |

OTHER PUBLICATIONS

French Search Report, dated Jan. 21, 2011, from corresponding French application.

* cited by examiner

*Primary Examiner* — Rob Swiatek
(74) *Attorney, Agent, or Firm* — Young & Thompson (57) ABSTRACT

A method and a device for deflating an inflated wall (1), wherein the inflated wall (1) is cut by using at least one cutting member adapted to cut the inflated wall (1) along a cutting line with the effect of causing a deflation opening of the inflated wall (1). The invention applies in particular to the inflated envelope of an aerostat balloon.

10 Claims, 4 Drawing Sheets

METHOD AND DEVICE FOR OPENING AN INFLATED WALL

The invention relates to a method and a device making it possible to quickly deflate an inflated wall, in particular the envelope of an aerostat balloon, by cutting it.

Inflated walls are encountered in many applications in numerous fields: in particular closed or semiclosed inflated envelopes. They have the advantage of being easy to transport because of their light weight and the small volume occupied when deflated. They are used particularly in the scope of lighter than air craft (aerostats), submarines or spacecraft. The inflated envelope, whether a balloon, an inflated structure or a sail, is often unmanned and difficult to access. There is therefore a need for a simple method and a simple device which make it possible to deflate such an inflated wall rapidly and remotely.

In the case of atmospheric and/or stratospheric aerostats, comprising one or more balloons and used inter alia for scientific measurement missions, deflation is a crucial step subject to stringent constraints. The techniques known (for example from CN 200954877) for deflating aerostat balloons are not reliable enough to allow accurate prediction of the landing site of the envelope of the balloon(s). In fact, the known techniques often make do with reduced opening of the inflated wall and it sometimes happens that poor deflation of the balloon leads to extended flight of the aerostat, which presents three risk factors. The first risk derives from the fact that extended flight of the aerostat increases the size of its probable landing zone. This can lead to loss of the aerostat, and therefore the expensive instruments which it contains. It may also constitute pollution in the event that the aerostat is lost in a natural environment which is difficult to access (sea, ocean, forest, etc.). The second factor is that an aerostat drifting in air currents constitutes a risk for the air traffic, which is becoming increasingly dense. The third factor is geopolitical, and is associated with inadvertent entry into a foreign airspace.

Furthermore, other solutions based on explosives, as described by JP 10 157697, present numerous drawbacks including: increased weight, risk at handling, increased geopolitical risks if a balloon loaded with explosive lands in a neighboring country, and an environmental risk because the explosion may form a large amount of debris from the inflated wall, etc.

It is therefore a general object of the present invention to resolve the problem of rapid but controlled deflation of an inflated wall.

It is more particularly an object of the invention to provide a method and device making it possible to deflate an inflated wall in a controlled and reliable way, in particular an inflated wall forming the envelope of an aerostat balloon.

In this context, it is a particular object of the invention to reduce the size of the probable landing zone of an aerostat.

It is also an object of the invention to provide a way of opening an inflated wall which gives rise to little or no debris originating from the inflated wall.

It is also an object of the invention to provide a simple and economical method for carrying out such deflation.

It is yet another object of the invention to provide a solution to this problem both in the case of an atmospheric or stratospheric inflated wall and in the case of a wall inflated on the ground, under the sea or in space.

It is particularly an object of the invention to provide a deflation solution which can be applied to any inflated wall which is difficult to access.

It is also an object of the invention to provide a simple method for deflating an inflated wall, which does not lead to the inflated wall being scattered into a plurality of pieces.

To this end, the invention provides a method for deflating an inflated wall, wherein said inflated wall is cut by using displacing at least one cutting member, adapted to cut the inflated wall, over the inflated wall along a cutting line with the effect of causing a deflation opening of the inflated wall.

The invention is applicable to any inflated wall, which may be defined as a thin flexible wall kept in place by pressure.

A device comprising an inflated wall may be of various types, for example: aerostat balloon, submarine balloon, sail, solar sail, inflated structure, pressurized structure, etc.

A cutting member is a member capable of cutting the inflated wall at least partly in its thickness. The depth of cutting into said inflated wall by such a member must be complete or sufficient for said wall to subsequently open rapidly by ductile and/or fragile rupture because of the tension of the wall due to its inflation.

A cutting member according to the invention may be of various types, for example a blade, a wire, a spike, a laser, etc.

It is the displacement of the cutting member over the inflated wall which makes it possible to cut the latter. Thus, the cutting front of the inflated wall moves over the surface of the inflated wall.

The progression of the cutting member along the inflated wall cuts the inflated wall along a substantially determined cutting line.

The invention extends to all types of inflated walls and to all types of cutting members. Likewise, the invention applies irrespective of the material from which the inflated wall is made: metal, synthetic (in particular plastic), of vegetal origin (for example paper), composite, a combination of these materials, or the like.

The material and the dimensions of the cutting member will be selected as a function of the characteristics of the inflated wall (material, thickness, pressure difference between its two faces, etc.).

Advantageously and according to the invention, at least one filamentary cutting member, referred to as a cutting cord, is used and a traction is exerted on the cutting cord, this traction being adapted so that the cutting cord passes through the thickness of the inflated wall and progressively cuts the inflated wall so as to form said cutting line.

A filamentary cutting member according to the invention may be made in various ways. For example, a braided line of filaments or an unbraided line (in a single piece, for example extruded), or alternatively a band or the like, may be used.

A cutting cord according to the invention may be made of any type of material, in particular metal (cable), vegetal (for example a hemp rope), synthetic (plastic, for example Kevlar®), composite, a combination of these materials, or the like.

Advantageously and according to the invention, each cutting cord is adapted—particularly as regards the choice of its (their) constituent material(s) and the way in which it is made—so that it is capable of cutting the inflated wall.

Advantageously and according to the invention, said cutting cord:
  initially extends over a portion of a face of the inflated wall,
  is initially fixed to at least one point, referred to as a fixing point, of the inflated wall,
  and said traction:
  is applied to at least one point of the cutting cord other than at least one fixing point, and by means of at least one filamentary member referred to as a control cord, and is oriented so as to make the cutting cord pass through the thickness of the inflated wall.

Thus, in an opening method according to the invention, at least one portion of the cutting cord is displaced so as to form an inflated wall cutting front which displaces along a cutting line over the surface of the inflated wall in order to open it progressively.

Specifically, according to a possible embodiment of the invention, a cutting cord is fixed by one of its ends to the inflated wall and the traction is exerted on its second end. Various other alternatives may be envisaged, in which a cutting cord is fixed to the inflated wall at a plurality of points, or at a point other than its end, and in which a traction is exerted at a point other than one of the ends of the cutting cord, or alternatively at a plurality of points thereof Furthermore, according to the invention it is sometimes possible to obviate a fixing point, so long as a traction is exerted at least two at points of the cutting cord, one of the tractions acting as a fixing point for the other.

Furthermore, according to the invention, each cutting cord is arranged on an inflated wall so as not to risk damaging it prematurely during use of the inflated wall in the inflated state. This condition requires in particular that the cutting cord(s) be capable of adapting to variations in shape and particularly in volume, or to movements and in particular vibrations of the inflated wall. In particular, in an advantageous embodiment according to the invention, each cutting cord has a length from 5% to 10% greater than a predetermined length, referred to as a cutting length, of cutting the inflated wall necessary for its rapid deflation. This length depends on numerous factors according to the nature and dimensions of the inflated wall, and the environment in which it travels, for example: the volume enclosed by the inflated wall, the difference in pressure and/or density between the interior and the exterior of the inflated wall, the deflation time of the inflated wall desired by the user.

For holding a cutting cord on the inflated wall, numerous alternative embodiments may be envisaged. For example, a cutting cord may be thermally welded on the inflated wall over its entire length or at regular intervals. One of these thermal welding regions, or a set of thermal welding regions, may act as a fixing point or fixing points.

The control cord or cords must also be arranged so that variations in shape, and particularly in volume, or movements and in particular vibrations of the inflated wall do not lead to premature cutting of the latter. In particular, in an advantageous embodiment of the invention, each control cord has a length from 50% to 80% greater—advantageously from 65 to 75% greater—than the minimum length, referred to as a control length, necessary for connecting the point of attachment of said control cord to a cutting cord to the point of attachment of said control cord to a traction device, the function of which is to exert said traction on at least one cutting cord via said control cord.

In particular, the length of each control cord is at least 5% to 15% greater—in particular 10% greater—than the length of a line of shortest path along the inflated wall between the point of attachment of said control cord to a cutting cord and the point of attachment of said control cord to a traction device, the function of which is to exert said traction on at least one cutting cord via said control cord.

Each control cord may be connected to one or more cutting cords. Likewise, each cutting cord may be connected to one or more control cords.

As for the cutting cord(s), such a control cord may be made of any type of material: metal (cable), vegetal (for example a hemp rope), synthetic (plastic, for example Kevlar®), biological or animal (for example silk or spider silk) or a combination of these materials.

Each control cord must be made of a material and particularly in a manner such that it can transmit a minimum traction force to the cutting cord, which is sufficient for cutting the inflated wall. In particular, the connection between a control cord and a cutting cord must be such that the cutting cord, which is generally stiffer or in any event cuts more effectively than the control cord, does not cut the latter when the traction force is being imparted by the control cord to the cutting cord.

In order to do this, various alternative embodiments may be envisaged. For example, in one possible variant of the invention, the mechanical connection between the control cord and the cutting cord may in particular be formed by a loop on one of the ends of each of the two cords to be connected. This loop may be reinforced by a material, in particular metal, which withstands the cutting force of the cutting cord when the traction force is being applied.

Furthermore, a traction exerted on a cutting cord by means of a control cord must be such that, at the point of attachment of the control cord to the cutting cord, the traction force must be exerted on the cutting cord in an orientation and a direction that makes it pass progressively through the inflated wall. Thus, if for example a cutting cord is arranged on the outside of the inflated wall, the traction force will need to have the effect of pulling said cutting cord toward the inside of this inflated wall.

If there are members for changing the direction of forces, for example pulleys, on the path of the control cord and/or cutting cord, the direction of the traction must be as described above at the point where the cutting cord passes through the inflated wall.

Advantageously, the traction exerted on this point of the cutting cord is oriented toward the half-space defined by a plane tangent to the inflated wall at this point, complementary to the half-space in which the cutting cord initially lies, the traction tending to make the cutting cord pass through the inflated wall.

Advantageously, the traction is also oriented in this half-space in a sense such that it tends to fold the cutting cord in two at the point where it passes through the inflated wall.

Furthermore, the cutting cord being fixed to a point other than the point where the traction is exerted, the traction must have a sufficient strength for the cutting cord to pass progressively through the inflated wall from the point where the traction is applied to it, in the direction of its point of attachment to the inflated wall, so as to form a cutting front moving over the surface of the inflated wall. This passage through the inflated wall, from the point where the traction is applied to the point of attachment of the cutting cord, determines the cutting line of the inflated wall.

In particular, such traction must be capable of breaking the connections holding the cutting cord on the inflated wall, for example regions where the cutting cord is thermally welded to the inflated wall, so as not to interrupt the cutting of the inflated wall.

Advantageously and according to the invention,
  the inflated wall is an inflated envelope of an aerostat balloon, said aerostat comprising at least one mass, referred to as a payload, suspended during flight from at least one balloon of the aerostat using a suspension device,
  in order to cut said inflated wall, at least one payload is connected to at least one control cord connected to at least one cutting cord, and the suspension device of this payload is deactivated so that it is suspended from the control cord and exerts a traction under the effect of its weight on the latter.

An aerostat is a device for floating in an atmosphere by using one or more gases which are lighter than this atmosphere owing to their nature or by their physical conditions (for example temperature). An aerostat comprises in particular at least one balloon formed by an inflated envelope having an inflated wall which is closed or semiclosed (that is to say comprising at least one opening with a size very much smaller than its total surface area).

A payload is a mass which is added to the aerostat and is not directly necessary for the latter to float in an atmosphere. Such a payload fulfills functions intrinsic to a mission relating to each aerostat flight. For example, a payload may consist of one or more scientific measurement devices.

Using a payload of the aerostat to pull on at least one cutting cord has the advantage of not requiring an additional device dedicated solely to exerting this traction. Thus, the device associated with such a method is simplified and less expensive, and adds little or no weight to the payload.

Nevertheless, other variants are possible. For example, there is nothing to prevent a traction device such as a motor from being used for any inflated wall.

According to the invention, various alternative embodiments of a suspension device may be envisaged.

A suspension device according to the invention may be produced using one or more suspension lines. These suspension lines may be of various types, flexible or rigid, and made of any type of material. Other suspension devices may be envisaged. For example, there is nothing to prevent magnetic suspension from being envisaged.

During the working flight of the aerostat, that is to say before the deflation method is carried out, any payload is suspended from at least one balloon of the aerostat by means of the suspension device. The suspension device is termed active during the working flight, that is to say for as long as it fulfills its function of suspending the payload or payloads from at least one aerostat balloon. It is termed inactive when it no longer fulfills the suspension function.

During the deflation, that is to say after the end of the working flight, at least one payload is connected to the rest of the aerostat only by one or more control cords, on which it exerts a traction owing to its weight. To this end, the suspension device of this payload is at least partly deactivated at the end of the working flight.

Advantageously, according to one embodiment of the invention, a first rupture device is used to deactivate the suspension device.

The rupture device used depends on the nature of the suspension device, and above all on the way in which it is activated and deactivated. Specifically, a suspension device according to the invention may comprise a locking member (for example a mechanical bolt, controlled magnets, certain types of knots, etc.). A suspension device may alternatively not comprise a locking member.

If the suspension device has a locking member, it will be sufficient to provide a rupture device which unlocks the locking member. On the other hand, if the suspension device does not have a locking mechanism between the payload and its point(s) of attachment to the aerostat, it will be necessary to use a rupture device which at least partly breaks the suspension device.

In this step, the unlocking (or respectively rupture) of at least a part of the suspension device, that is to say at least one suspension line, must be sufficient for the payload to exert a traction on at least one cutting cord by means of a control cord.

In particular, the traction of the payload is commensurately more effective when it is no longer suspended at all from the rest of the aerostat. In order to achieve this, a sufficient part of the suspension device must be deactivated so that the rest of the suspension device is deactivated by rupture or unlocking by the weight of the payload.

The most reliable embodiment further consists in fully deactivating the suspension device (by rupture or unlocking).

Several variants may be envisaged for producing this first rupture device (mechanical, electronic, pyrotechnic, etc.). Nevertheless, in an advantageous embodiment according to the invention, a rupture device, in particular of the pyrotechnic type, is associated with suspension lines which do not have a member for locking a payload. This first rupture device may be programmed to be activated as a function of predetermined criteria.

For example, such a criterion may be a time elapsed since takeoff of the aerostat. Other criteria may also be used for triggering the rupture device, such as a remote-control signal, one or more meteorological conditions, a pressure, a position, a signal transmitted by the instruments loaded on board the balloon of the aerostat or on board the payload, or the like.

From the moment when the suspension device is deactivated, the payload pulls on the control cord, or one of the control cords, which impart(s) at least some of the weight of the payload to the cutting cord(s) to which it is or they are connected.

According to one embodiment of the invention, when the suspension lines are fully deactivated and a payload is then only connected to the rest of the aerostat by one of the control cords, the control cord(s) is/are also deactivated after cutting the inflated wall in order to separate the payload from the deflated envelope. Just like a suspension device, a control cord may or may not have a locking member for the purpose of activating or deactivating it. A control cord is termed activated when it is capable of transmitting a traction. Generally, a control cord is termed deactivated when it is divided into two separate parts.

A second rupture device is provided for this purpose, and may be programmed as a function of predetermined criteria. The predetermined criteria may for example be a degree of tearing and/or deflation of the inflated wall, or alternatively a remote-control signal, one or more meteorological conditions, a pressure, a position, a signal transmitted by the instruments of the inflated wall, or the like. In particular, the criterion or criteria may be a time elapsed since takeoff of the inflated wall and/or since rupture of the suspension lines.

In the latter case, numerous means may be envisaged, such as delayed-effect pyrotechnic devices, electronic timing devices, etc. Likewise, in general, several types of technical solutions may be envisaged in order to produce this second rupture device (pyrotechnic, mechanical, magnetic, etc.).

The invention extends to a device for deflating an inflated wall, wherein it comprises at least one cutting member adapted to cut said inflated wall by displacement of the cutting member over the inflated wall along a cutting line, causing a deflation opening of the inflated wall.

A cutting member according to the invention may be in several forms. It may in particular belong to cutting members having a blade or members for cutting by a wire, having dimensions adapted to said inflated wall.

A cutting member according to the invention is capable of at least partly cutting the thickness of the inflated wall kept in place by a fluid pressure. That is to say, a cutting member according to the invention is capable of cutting said inflated wall deeply enough for it to open rapidly by ductile or fragile rupture because of its internal tension due to inflation. Advantageously, a cutting member according to the invention is capable of cutting such an inflated wall over its entire thickness.

In particular, according to an advantageous embodiment, a deflation device according to the invention comprises at least one filamentary cutting member, referred to as a cutting cord, capable of being pulled by a traction adapted so that, by moving over the inflated wall, the cutting cord passes through the thickness of the inflated wall and progressively cuts the inflated wall so as to form said cutting line.

Furthermore, advantageously and according to the invention, said cutting cord:
  initially extends over a portion of a face of the inflated wall,
  is initially fixed to at least one point, referred to as a fixing point, of the inflated wall,
  is capable of being pulled at least at one point other than at least one fixing point, and
  is attached to at least one filamentary member, referred to as a control cord, which is:
  capable of imparting a traction to said cutting cord, and
  arranged so that the traction which it imparts to the cutting cord is oriented so as to make it pass through the thickness of the inflated wall.

Each cutting cord is arranged on the inflated wall so as not to damage the inflated wall during use of the inflated wall. In particular, it or they may have a sufficient elasticity to compensate for the deformations and the vibrations or movements of the inflated wall during its use. As an alternative or in addition, each cutting cord may have a length greater than the minimum required length in order to compensate for the deformations, vibrations and/or movements of the inflated wall. Other passive or active means may be provided for this purpose.

Each cutting cord may be connected to the inflated wall at one or more points, in particular by thermal welding. This has several advantages. It makes it possible to prevent them from moving over the surface of the inflated wall during use of the latter and therefore avoid any interference with the mission in which the inflated wall is taking part. A second advantage is that it facilitates cutting when a traction is applied to it. Furthermore, in the case particularly of a cutting cord with a length greater than the cutting length, these connections make it possible to approximately determine the line along which this cutting cord will cut the inflated wall.

The fixing point(s) of a cutting cord make it possible to prevent them from passing longitudinally through a single hole in the inflated wall substantially of the same diameter as the cutting cord.

A traction device according to the invention may take several forms. In particular, a traction device may exert a traction on a cutting cord by its own weight. Such a traction device may also be active and equipped, for example, with a motor. Numerous other ways of producing such a device may be envisaged in the scope of the present invention.

In particular, when a cutting cord is attached to such a control cord and when it is attached to the inflated wall only by a fixing point, the point of attachment between the control cord and the cutting cord is advantageously different to the point where the cutting cord is fixed to the inflated wall, so that the cutting length is non-zero and said cutting cord does not pass longitudinally through the inflated wall once the fixing point has been broken.

A control cord according to the invention must be capable of withstanding the traction exerted by a traction device and imparting it to the cutting cords to which it is attached. In particular, the point(s) of attachment of each control cord to each cutting cord must be such that the cutting cord cannot cut the control cord. For example, the control cord may be locally reinforced or protected by a metal part.

According to one embodiment of the invention,
  the inflated wall is an inflated envelope of an aerostat balloon, said aerostat comprising at least one mass, referred to as a payload, suspended during flight from at least one balloon of the aerostat using a suspension device,
  at least one payload is connected to at least one control cord, itself connected to at least one cutting cord,
  the suspension device of this payload comprises a device for deactivating the suspension device, which is adapted so that the payload can be suspended from the control cord and can exert a traction under the effect of its weight on the latter.

In this case, the weight of the payload is used as a traction force on one or more cutting cords by means of one or more control cords.

A rupture device may be actuated as a function of one or more predetermined criteria of widely varying natures, as already mentioned during the description of the deflation method.

Likewise, the rupture device may be produced using different technical means as a function of the nature of the inflated wall, the traction device and the suspension device.

Particularly in the case of an aerostat, the rupture device deactivates all or part of the suspension device of at least one payload. Such a rupture device may in particular be produced using pyrotechnic means.

The invention also relates to a method or a device comprising in combination all or some of the characteristics mentioned above or below.

The invention extends to any aerostat of which at least one of the balloons comprises at least one inflated envelope equipped with a device comprising in combination all or some of the characteristics mentioned above or below.

Other features, objects and advantages of the invention will become apparent from the following detailed description, with reference to the drawings which represent two preferred embodiments thereof by way of non-limiting examples. In these drawings.

The inflation method according to the invention consists principally in cutting an inflated wall 1 by using at least one cutting member so as to deflate it rapidly and reliably.

Figure 1:
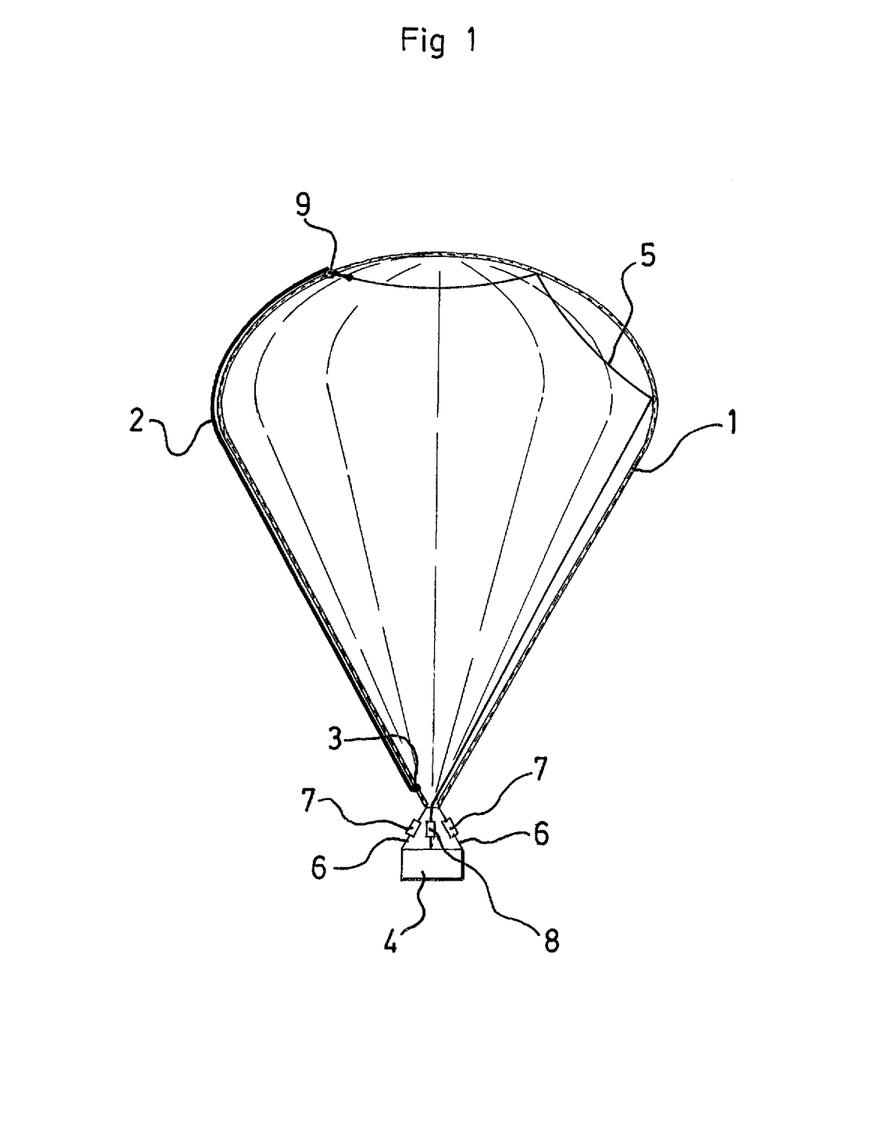
FIG. 1 is a schematic representation in longitudinal section, that is to say through a plane containing the vertical axis, of an inflated atmospheric/stratospheric wall 1, or aerostat, of the balloon probe type equipped with a payload 4 and with a device corresponding to a first variant according to the invention.

In a first alternative embodiment, the method according to the invention is carried out on a balloon probe by a device according to the invention comprising:

- as the cutting member, a line referred to as a cutting cord 2, fixed at its first end at a point, referred to as a fixing point 3, to an inflated wall 1 of the aerostat type comprising in particular an inflated envelope 1, said cutting cord 2 being arranged on the external surface of the envelope 1,
- a line referred to as a control cord 5, attached at its end to the second end of the cutting cord 2,
- a payload 4 attached to the envelope 1 by means of suspension lines 6,
- a device 7 for rupturing the suspension lines,
- a device 8 for rupturing the control cord.

Throughout what follows, the term "working flight" refers to the flight period of the aerostat between the moment of take-off and the moment of rupturing the suspension lines 6.

Furthermore, before deactivation by rupturing the suspension lines 6, the cutting cord 2 passes through the envelope 1 at a point referred to below as the "crossing point 9".

The cutting starts from this crossing point 9. The moving point where the cutting cord passes through the inflated wall during the cutting is referred to below as the "cutting point 10". Before initiating the cutting method, and at time t=0 of the cutting, the cutting point 10 and the crossing point 9 are the same.

During the working flight of the balloon probe, the cutting and control cords 2; 5, respectively, are arranged so as not to interfere with the flight, and in particular not to damage the envelope 1. To this end, the cutting cord 2 is arranged on the envelope 1 so as to form small zigzags (not represented in the figures) along the envelope. The cutting cord 2 is in particular thermally welded to a plurality of points of the inflated wall in order to keep the cutting cord 2 in place during the working flight of the aerostat.

Also for this purpose, the control cord 5 has a length about 75% greater than the control length and is arranged inside the envelope according to the representation in FIG. 1, that is to say it is weakly attached to certain internal points of the envelope 1, in order not to pull superfluously on the cutting cord 2 during the working flight of the balloon probe, but also in order not to form knots which could interfere with carrying out the deflation method.

The control length in the present case is defined as the straight-line distance from the point of attachment of the control cord 5 to the payload 4 as far as its point of attachment to the cutting cord 2.

The deflation method according to the invention comprises the steps described below.

The device 7 for rupturing the suspension lines, which comprises pyrotechnic charges, is activated as a function of a time elapsed since takeoff of the aerostat, measured by a timer which triggers its activation at the end of the working flight of the balloon probe. The suspension lines are deactivated by rupture.

Figure 2:
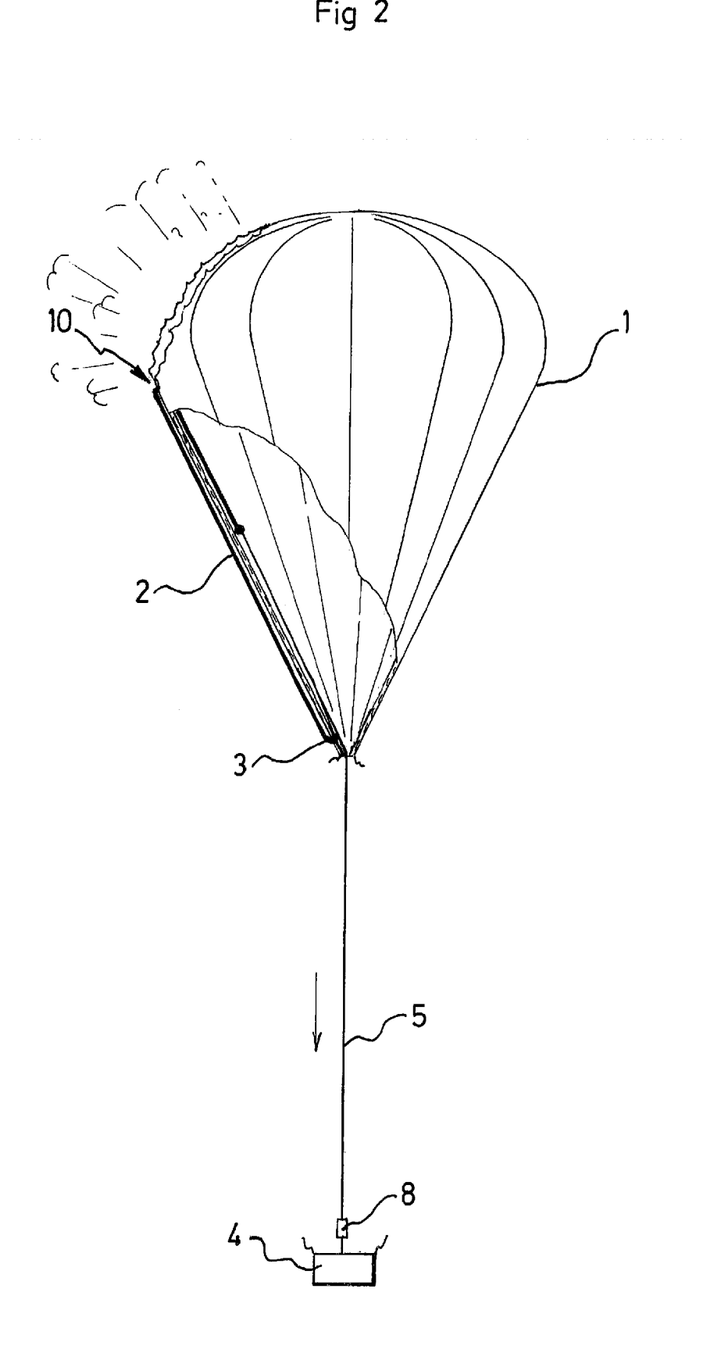
FIG. 2 is a schematic representation in longitudinal section of the inflated wall 1 of FIG. 1, represented while a method according to the invention for cutting the inflated wall 1 is being carried out.

The payload 4 is then no longer suspended from the balloon probe and it falls under its own weight, while taking the control cord 5 with it.

The control cord 5 is successively detached from its points of weak attachment to the inside of the envelope as the payload 4 increases speed. When the control cord 5 is stretched between its point of attachment to the payload 4 and its point of attachment to the cutting cord 2, it starts to impart the traction force due to the weight of the payload 4 to the cutting cord 2.

The excess length of the control cord 5 is useful so that the payload 4 acquires speed before the cutting step per se. For this reason, the payload 4 has a non-zero momentum at the start of the cutting, which allows the cutting to be initiated more easily. In particular, in the event that the weight of the payload 4 is less than the force necessary for cutting the inflated wall, the momentum acquired by the payload 4 makes it possible to cut the inflated wall over a distance which is commensurately greater when the momentum acquired by the payload 4 is higher.

From the instant when the control cord 5 is stretched, the cutting cord 2 starts to progressively cut the envelope 1, from the crossing point 9 to the fixing point 3. At least one portion of the cutting cord 2 moves relative to the inflated wall, and the cutting front moves over the surface of the inflated wall along a cutting line.

In particular, it is necessary for the traction force to have a sense oriented toward the open half-space complementary to the closed half-space defined by a plane A tangent to the inflated surface at the cutting point 10, and containing the part of the cutting cord which has not yet cut the inflated wall. That is to say, the cutting cord forms an angle of less than 180° at the cutting point 10. Thus, if the cutting cord is prearranged outside (or respectively inside) the inflated wall, the traction force will have to be oriented toward the interior (or respectively exterior) of the inflated wall.

The direction and the sense of the traction force applied to the cutting cord 2 may be optimized for better cutting according to the shape and nature of the inflated walls and the power of the traction device.

For example, it is advantageous to exert a traction force whose direction is substantially coplanar with the overall direction of the cutting cord before it cuts the inflated wall, thus defining a plane B. Furthermore, it is also advantageous for the traction force to have a sense oriented into the open half-space defined by a plane orthogonal to the planes A and B and by the side where the cutting cord 2 is located before cutting the inflated wall. That is to say, the cutting cord forms an angle of less than 90° at the cutting point 10 of the inflated wall.

Advantageously and according to the invention, the fixing point 3 is lower than the crossing point 9. Although not necessary, this arrangement allows easier and therefore more effective tearing of the envelope 1. This is because, since the traction is exerted by the weight of a payload 4, it is a priori oriented downward overall. If the fixing point of the cutting cord 2 is placed lower than the crossing point 9, the traction exerted on the cutting cord 2 will satisfy the criteria for optimization of the traction force.

Figure 3:
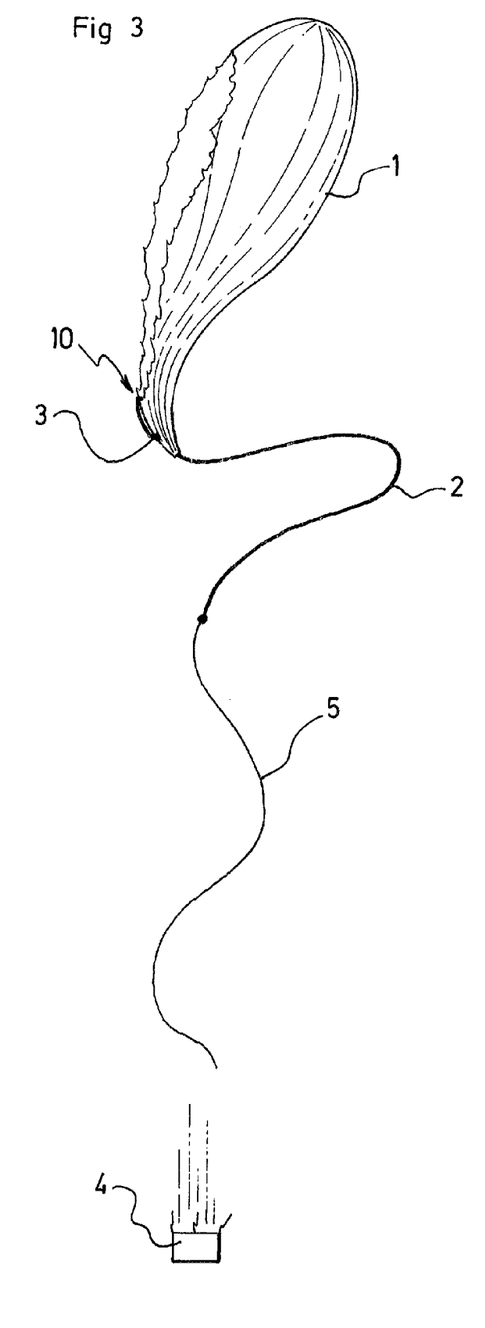
FIG. 3 is an external schematic representation of the inflated wall of FIG. 1, represented after the method according to the invention for cutting the inflated wall 1 has been carried out.

During the cutting, or after the cutting cord 2 has cut the envelope 1 as far as the fixing point 3, the device 8 for rupturing the control cord is activated and the payload 4 is released from the envelope 1. The envelope 1 is then cut and partially or fully deflated. In particular, the rupture device 8 is activated after a predetermined time following rupture of the suspension lines.

Figure 4:
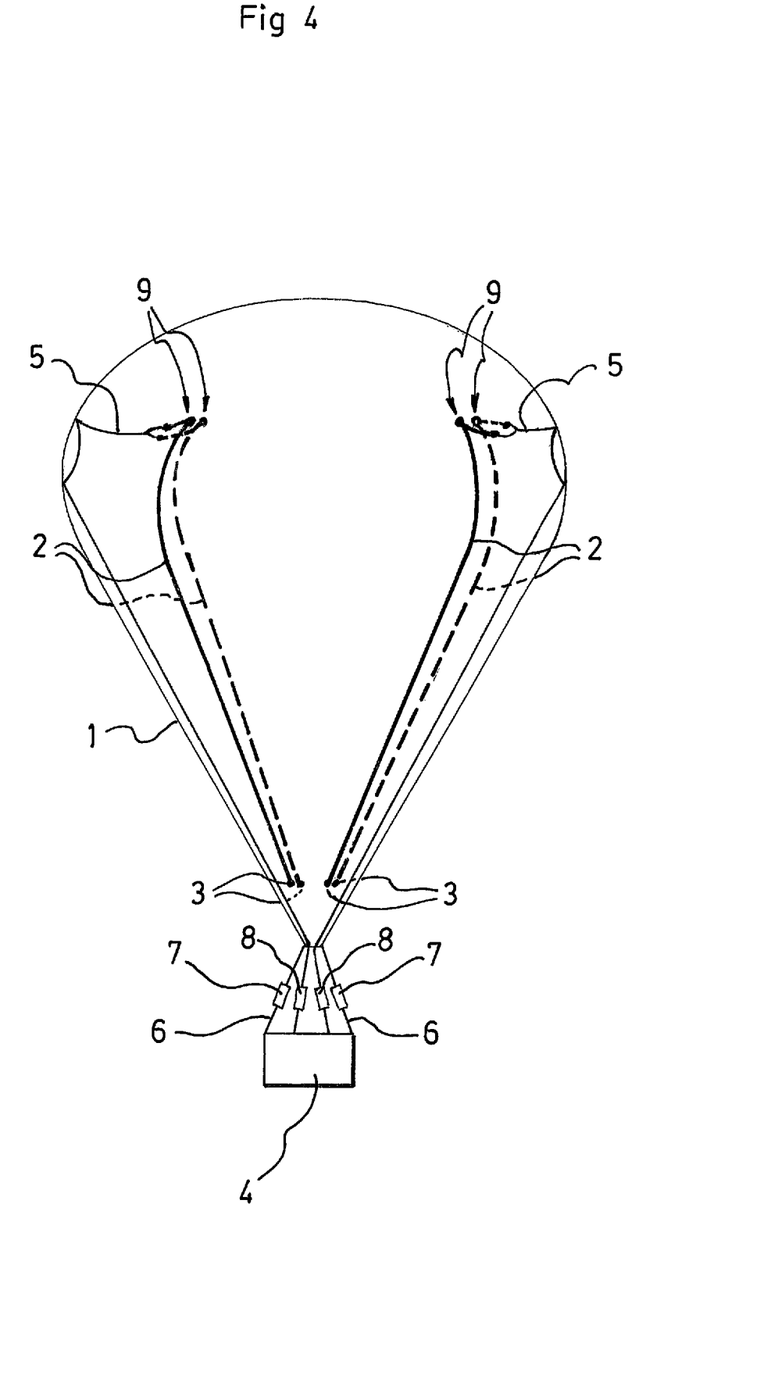
FIG. 4 is a schematic representation of an inflated atmospheric/stratospheric wall 1, or aerostat, of the balloon probe type equipped with a payload 4 and with a device corresponding to a second variant according to the invention.

A device according to the invention in a second alternative embodiment is schematically represented in FIG. 4. It differs from the device described above and represented in FIGS. 1, 2 and 3 in that it comprises a plurality of cutting cords 2 and a plurality of control cords 5. In particular, in the variant presented, the device comprises two control cords 5 and four cutting cords 2. Each of the control cords 5 is attached to one of two separate groups of cutting cords 2.

Each of the control cords 5 and cutting cords 2 is arranged respectively in and on the envelope in a similar way to the variant described above. In particular, the cutting cords 2 are each fixed to a point 3 of fixing to the inflated wall. Said fixing point 3 may be common to the four cutting cords 2, or the fixing points may differ. Furthermore, the fixing point(s) 3 is or are located lower on the envelope respectively than the crossing point(s).

The invention may be the subject of numerous other alternative embodiments which have not been represented. In particular, it is possible to use a device consisting of a different number of cutting cords 2 and control cords 5 to the two variants represented on the one hand in FIGS. 1, 2 and 3 and on the other hand in FIG. 4.

Likewise, the cutting cords 2 are not necessarily attached to the inflated envelope by one of their ends, but may be attached to it by one or more arbitrary fixing points 3. For example, the fixing point 3 may lie in the middle of the cutting cord 2, in which case the traction can be exerted from the two ends of the same cutting cord 2.

The function of the fixing point may be fulfilled by thermal welding of all or some of a cord.

The cutting cords 2 may be initially arranged on the outside and/or on the inside of the inflated wall.

Advantageously, in the case in which a plurality of cutting cords 2 and a plurality of control cords 5 are used, a control cord is attached at different points to the cutting cords to which it is connected. The distance between these points of attachment allows the start of cutting for each of the cutting cords to be distributed over time. This distribution over time makes it possible to prevent a significant shock from being experienced in the control cord and running the risk of breaking it. Specifically, at the start of cutting by a cutting cord, a strong traction force is necessary in order to initiate the cutting. If all the cutting cords connected to a given control cord start their cutting at the same time, the traction exerted on the control cord must be very great at the moment when the cutting is initiated.

Furthermore, proposing to start cutting the inflated wall 1 by all the cutting cords 2 at the same time entails the risk that the top of the envelope of the balloon will be pressed downward, attenuating the traction force at the start of cutting. The attenuated force might therefore be insufficient to initiate or continue the cutting.

In the same way, it is advantageous to provide control cords having different lengths to one another so that they do not initiate a plurality of cuts simultaneously.

Furthermore, in the case of inflated walls other than an aerostat and not necessarily having a payload 4, the traction device may be of a different type. For example, the traction device may comprise a motor.

So that the inflated wall is not damaged by a control cord 5 or by a cutting cord 2, passive or active means other than a simple excess of length may be employed.

Furthermore, cutting members other than a line may be used. For example, cutting members comprising at least one blade or a spike, devices for cutting by locally applying a high temperature, etc.

Lastly, numerous rupture devices may be employed for deactivating the suspension device. These rupture devices may be pyrotechnic, electrical, electronic, mechanical, etc. They may furthermore be triggered by numerous types of criteria as already explained above.

The invention claimed is:

1. A method for deflating an inflated wall comprising:
   cutting the inflated wall by progressively displacing at least one filamentary cutting cord, adapted to cut the inflated wall, over the inflated wall along a cutting line and through a thickness of the inflated wall at a moving cutting point along the cutting line,
   and exerting traction to at least one point of the at least one cutting cord to progressively displace the at least one cutting cord over and through the inflated wall.

2. The deflation method as claimed in claim 1, wherein the traction is oriented so as to make the at least one cutting cord form an angle of less than 90° at the cutting point.

3. The deflation method as claimed in claim 1, wherein the at least one cutting cord is initially fixed to at least one fixing point of the inflated wall, and wherein the traction is oriented so as to displace the cutting point toward the at least one fixing point.

4. The deflation method as claimed in claim 1, wherein the at least one cutting cord:
   initially extends over a portion of a face of the inflated wall,
   is initially fixed to at least one fixing point of the inflated wall,
   and wherein the traction is applied to at least one point of the at least one cutting cord other than the at least one fixing point, and by at least one filamentary control cord.

5. The deflation method as claimed in claim 4, wherein:
   the inflated wall is an inflated envelope of at least one aerostat balloon of an aerostat comprising at least one payload, suspended during flight from at the at least one aerostat balloon using a suspension device,
   in order to cut the inflated wall, the at least one payload is connected to at least one control cord connected to the at least one cutting cord, and the suspension device of the at least one payload is deactivated so that it is suspended from the at least one control cord and exerts the traction on the latter under the effect of its weight.

6. A device for deflating an inflated wall, comprising at least one filamentary cutting cord, wherein
   said at least one filamentary cutting cord is initially fixed to at least one fixing point of the inflated wall, and is configured to:
   cut the inflated wall by being progressively displaced over the inflated wall along a cutting line and through the thickness of the inflated wall at a moving cutting point,
   be pulled by a traction (i) exerted at the at least one cutting point of the at least one cutting cord and (ii) adapted so that the at least one cutting cord is progressively displaced over and through the thickness of the inflated wall and (iii) oriented so as to displace the cutting point toward the at least one fixing point.

7. deflation device as claimed in claim 6, wherein the at least one cutting cord is capable of forming an angle of less than 90° at the cutting point.

8. The deflation device as claimed in claim 6, wherein the at least one cutting cord:
   initially extends over a portion of a face of the inflated wall, and
   is attached to at least one filamentary control cord, which is capable of imparting the traction to the at least one cutting cord.

9. The deflation device as claimed in claim 8, wherein:
   the inflated wall is an inflated envelope of at least one aerostat balloon of an aerostat comprising at least one payload, suspended during flight from the at least one aerostat balloon using a suspension device,
   the at least one payload is connected to at least one control cord, itself connected to the at least one cutting cord,
   the suspension device of the at least one payload comprises a device for deactivating the suspension device, which is adapted so that the at least one payload can be suspended from the at least one control cord and can exert a traction on the latter under the effect of its weight.

10. An aerostat comprising at least one balloon having at least one inflated envelope, wherein the aerostat comprises a device as claimed in claim 6 for deflating the at least one inflated envelope.

\* \* \* \* \*